(Model.)
W. S. FICKETT.
Machine for Making Food from Hulled Corn.
No. 233,085. Patented Oct. 12, 1880.
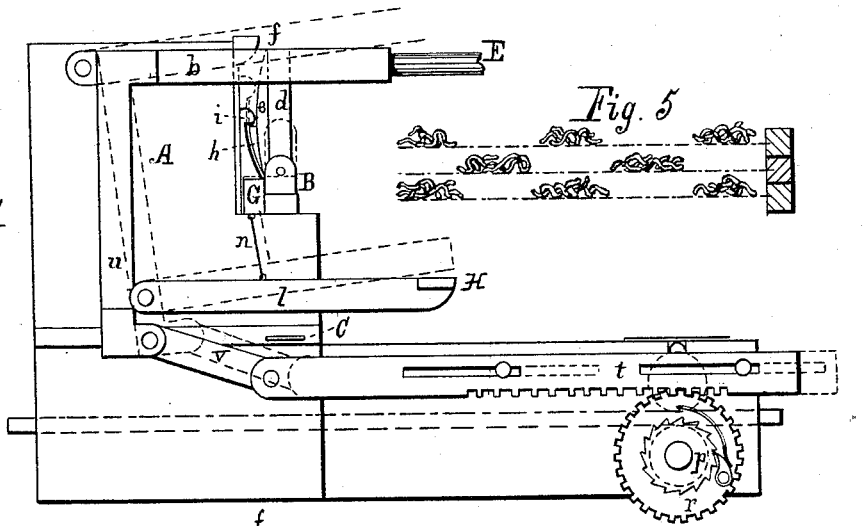
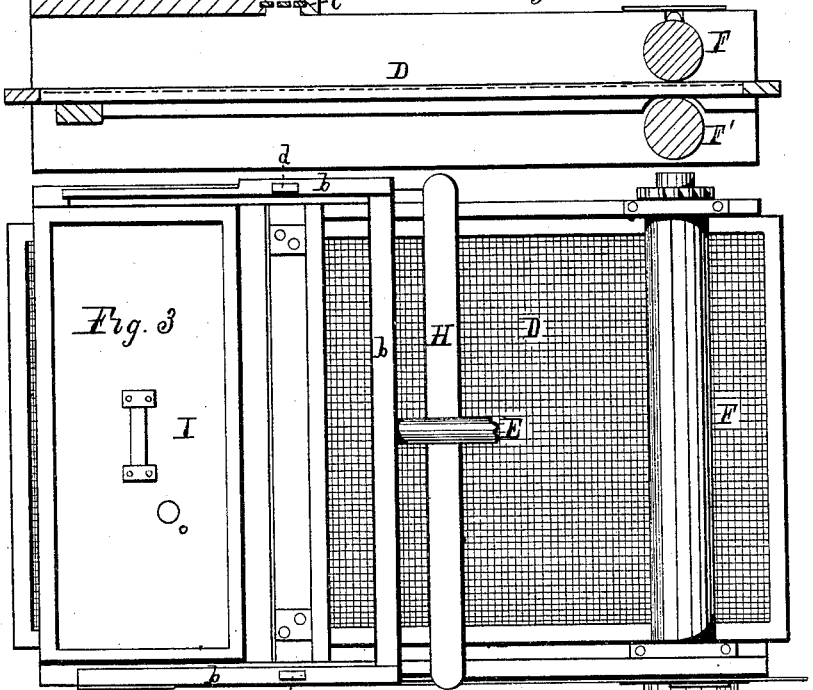
Witnesses:
W. M. Rebasz, Jr.
C. B. Rebasz.
Inventor:
Wm. S. Fickett,
by G. B. Selden, Atty.

United States Patent Office.

WILLIAM S. FICKETT, OF ROCHESTER, NEW YORK, ASSIGNOR TO WILLIAM W. SHERAR, OF SAME PLACE.

MACHINE FOR MAKING FOOD FROM HULLED CORN.

SPECIFICATION forming part of Letters Patent No. 233,085, dated October 12, 1880.

Application filed March 17, 1880. (Model.)

*To all whom it may concern:*

Be it known that I, WILLIAM S. FICKETT, of the city of Rochester, in the county of Monroe and State of New York, have invented an Improved Machine for Preparing an Article of Food from Hulled Corn, of which the following is a specification, reference being had to the annexed drawings, in which—

Figure 1 is a side elevation of my improved apparatus for manufacturing my improved article of food. Fig. 2 is a central vertical section of the same. Fig. 3 is a plan view of the same. Fig. 4 represents a portion of the perforated plate, showing the arrangement of the openings therein. Fig. 5 is a vertical section through the trays upon which my improved article of food is dried, showing the same placed thereon in alternating parallel layers. Fig. 6 represents my improved article of food in its finished condition ready for market.

My invention relates to an improved machine or apparatus for manufacturing an article of food from hulled corn or other grain by steaming or cooking the same and then forcing the plastic mass through a perforated plate upon a moving tray or sieve, the said plate having its openings at such a distance apart that the fibrous material, on emerging from the plate, will not coalesce, but will pass vertically, or nearly vertically, downward until on coming in contact with the moving tray the fibers are bent or forced sidewise and caused to arrange themselves in an irregular overlapping manner upon the tray, in which condition the material is dried without removal from the tray.

My improved apparatus is represented in the accompanying drawings, in which A represents a suitable hopper or receptacle for the cooked mass; B, the reciprocating plunger for forcing the material through the perforated plate C, and D the tray, which is arranged to have a forward motion simultaneous with the descent of the plunger B. E is a hand-lever by which the plunger B is operated. F F' are rollers by which the tray is fed forward underneath the hopper A. G is a valve which controls the passage of the material from the hopper to the chamber in which the plunger reciprocates.

The hopper A is provided at the lower part of one of its sides with an opening, $a$, which is closed by the valve G when in its lowest position. The lower edge of the valve G is beveled on the side toward the opening $a$, and the side of the bottom of the hopper may have a corresponding bevel. (See Fig. 2.) The plunger and valve are inclosed in a suitable chamber on the outside of the hopper.

Motion is given to the plunger B by means of the pivoted frame $b\ b\ b$, carrying the hand-lever E, and the connections $d\ d\ d$ at each side of the hopper. As the plunger rises it carries the valve G with it during a portion of its motion. A spring, $c$, attached to the plunger and extending upward therefrom, has a lug, $h$, on it, which engages with a catch, $i$, on an arm connected with the valve G, and causes the valve to rise upward with the plunger until the upper end of the spring, striking against a projection, $f$, on the hopper, disengages the lug $h$ from the catch $i$ and allows a weight on the cross-bar H of the pivoted frame $l$ to depress the valve G. In order to insure the proper motion on the valve, this spring and catch mechanism is placed at each end of the valve. The frame is pivoted to the hopper on each side thereof, and is connected to the valve G at each end by the connections $n$.

As the plunger B rises the cooked material is forced into the plunger-chamber through the opening $a$ by the pressure of the atmosphere on the material.

The surface of the material in the hopper may be covered with a follower, I, Figs. 2 and 3, provided with a handle and a vent-hole, $o$, to facilitate its removal. The passage $a$ being closed by the valve G, the plunger B, in its descent, forces the cooked material through the perforated plate C onto the moving tray D. Motion is given to the tray, which is covered with wire-cloth, by the feeding-rollers F F', which are operated by the ratchet $p$, gear $r$, and sliding rack $t$. An arm, $u$, attached to the pivoted frame $b$ and connected at its lower end with the sliding rack by the bar V, gives a to-and-fro motion to the rack when the hand-lever E is reciprocated. The roller F' receives an intermittent motion in one direction from the ratchet. As the motion of the tray is simultaneous with the descent of the plunger, the cooked material, passing through the perforated plate C in threads or fibers, descends upon the tray, and is by its motion deflected sidewise and caused to arrange itself on the tray in an irregular interlacing manner, each fiber adhering to each other fiber wherever they cross, but leaving open spaces of indefinite outline between them. In this condition the material is dried without removal from the tray, forming a mass of irregularly interlacing fibers, as represented in Fig. 6. In consequence of the open structure of the material on the tray the drying is effected rapidly and with a minimum amount of heat, and the dried article possesses the property of being readily prepared for consumption as an article of food. It is only necessary to pour boiling water on it, when in a few minutes a palatable and nutritious dish is produced.

In order to facilitate the drying of the interlacing fibrous mass, I arrange the openings in the plate C in series separated by a solid portion of the plate, as represented in Fig. 4. The consequence of this construction is that the fibrous material is arranged on the tray in parallel layers, as represented in the transverse section, Fig. 5.

By reversing each alternate tray the layer on one tray is made to come over an open space on the next lower tray, so that the current of air employed for drying is caused to pass in a zigzag course through the layers of material, whereby the process of drying is much facilitated.

In the operation of my improved apparatus I take the ordinary hulled corn of commerce and cook it by boiling or steaming in any convenient way until it is thoroughly done, using as little water as possible.

The grains are sufficiently cooked when they crush readily between the fingers, and the cooking should not be carried so far as to reduce the grains to a pulpy mass. Each grain should retain after the cooking its own individual form, but it should be thoroughly softened, and with the employment of as little water as possible.

The plunger B should be narrow in proportion to its length, and its longitudinal axis should be arranged transversely to the line of motion of the sieve.

I am aware that it is not new to force grain of various kinds after cooking or steaming through sieves for the purpose of separating the hard from the soft portions, and such process I do not claim, as corn or other grain cannot be worked in the apparatus herein described except it has been previously hulled.

I make no claim herein to the improved article of food made by the improved machine I have described, as I propose to include the said article of food in another application for Letters Patent.

I claim—

1. The combination of the hopper A, plunger B, having reciprocating motion within a chamber provided at its bottom with perforated plate C, valve G, and intermittently-moving sieve D, substantially as described.

2. The combination of the hopper A, plunger B, having reciprocating motion within a chamber provided at its bottom with perforated plate C, and valve G, located between the hopper and the chamber and operated from the plunger by suitable mechanism, substantially as described.

3. The combination of the hopper A, plunger B, having reciprocating motion within a chamber provided at its bottom with perforated plate C, valve G, spring e, catches h i, lug f, and weighted lever l, substantially as described.

WILLIAM S. FICKETT.

Witnesses:
W. M. REBARY, Jr.,
D. A. CONE.